(12) United States Patent
Enis et al.

(10) Patent No.: US 10,144,014 B2
(45) Date of Patent: Dec. 4, 2018

(54) GAS TURBINE SYSTEM (71) Applicant: EnisEnerGen, LLC, Henderson, NV (US)

(72) Inventors: Ben M Enis, Henderson, NV (US); Paul Lieberman, Torrance, CA (US)

(73) Assignee: EnisEnerGen, LLC, Henderson, NV (US)

( * ) Notice: Subject to any disclaimer, the term of this patent is extended or adjusted under 35 U.S.C. 154(b) by 0 days.

(21) Appl. No.: 15/632,081

(22) Filed: Jun. 23, 2017

(65) Prior Publication Data
US 2018/0318846 A1 Nov. 8, 2018

Related U.S. Application Data (63) Continuation-in-part of application No. 15/585,035, filed on May 2, 2017.

(51) Int. Cl.
| | | |
|---|---|---|
| *B01D 45/00* | (2006.01) | |
| *B04B 5/08* | (2006.01) | |
| *B01D 45/14* | (2006.01) | |
| *F01D 25/02* | (2006.01) | |
| *B04B 9/02* | (2006.01) | |
| *B04B 11/06* | (2006.01) | |
| *B04B 5/12* | (2006.01) | |
| *F01M 13/04* | (2006.01) | |

(52) U.S. Cl.
CPC .............. *B04B 5/08* (2013.01); *B01D 45/14* (2013.01); *F01D 25/02* (2013.01); *B04B 5/12* (2013.01); *B04B 9/02* (2013.01); *B04B 11/06* (2013.01); *B04B 2005/125* (2013.01); *F01M 13/04* (2013.01); *F01M 2013/0422* (2013.01)

(58) Field of Classification Search
CPC .. B04B 5/08; B04B 11/06; B04B 9/02; B04B 5/12; B04B 2005/125; B01D 45/14; F01D 25/02; F01M 2013/0422; F01M 13/04
See application file for complete search history.

(56) References Cited

U.S. PATENT DOCUMENTS

| | | | | |
|---|---|---|---|---|
| 1,845,358 A | * | 2/1932 | Stebbins | .................. B07B 7/08 209/712 |
| 3,095,369 A | * | 6/1963 | Jager | ....................... B07B 4/025 209/139.2 |
| 4,001,121 A | * | 1/1977 | Bielefeldt | .............. B01D 45/14 209/722 |
| 4,711,720 A | * | 12/1987 | Young | ...................... B04C 5/26 209/729 |

(Continued)

*Primary Examiner* — Dung H Bui
(74) *Attorney, Agent, or Firm* — MU P.C.

(57) ABSTRACT

The present invention is a centrifuge to be used for removing ice particles from the air fed to a gas turbine system. In an embodiment, the centrifuge is comprised of three ducts defining an air-path which comprises of two bends greater than 90 degrees. In an embodiment, the first two ducts extend past the bends to provide a dead air zone to trap ice particles which have been introduced by cooling air containing moisture. The dead air zones are further provided with revolving doors which remove the ice particles from the system. In an embodiment, the centrifuge receives cold air from the compander and removes ice particles before exhausting the cold air to a gas turbine electric generator, such that the blades of the gas turbine generator are not damaged by the ice particles.

4 Claims, 7 Drawing Sheets

(56) References Cited

U.S. PATENT DOCUMENTS

| | | | | |
|---|---|---|---|---|
| 5,180,486 | A * | 1/1993 | Smolensky | B01D 45/12 210/195.1 |
| 5,494,501 | A * | 2/1996 | Anspach | B01D 45/14 55/330 |
| 5,554,343 | A * | 9/1996 | Wade | B04B 5/08 422/177 |
| 2004/0040442 | A1 * | 3/2004 | Franzen | B01D 45/14 95/270 |
| 2006/0168921 | A1 * | 8/2006 | Cheng | B01D 45/12 55/337 |
| 2014/0230381 | A1 * | 8/2014 | Tornblom | B04B 5/12 55/317 |

* cited by examiner

```
91.8 #/sec
0.075 #/scf
1,224 scf/sec
    7 ft per side
   49 sq ft cross-section
24.98 ft/sec (Uo)

28 ft long extension
   beyond 135 degrees bend
or
14 ft long extension
   beyond 135 degrees bend
   for 4 ducts; each 3.5 ft per side
```

FIG. 6B

```
91.8 #/sec
0.075 #/scf
1,224 scf/sec
  3.5 ft per side
12.25 sq ft cross-section
99.92 ft/sec (Uo)

14 ft long extension
   beyond 135 degrees bend
```

GAS TURBINE SYSTEM

CROSS-REFERENCE TO RELATED APPLICATION(S)

The present application claims priority to U.S. Provisional patent application Ser. No. 15/585,035 filed on May 2, 2017, entitled "Design for Green Communities" the entire disclosure of which is incorporated by reference herein.

BACKGROUND OF THE INVENTION

1. Description of Related Art

Commercial chilling systems for gas turbine inlet air are a strongly beneficial option for installations where high ambient temperatures are common, especially in power plant rooms that can often reach 100° F. because of the generated waste heat of the gas turbine combustion system whereas the outside air temperature may be 70° F. Commercial chilling systems for inlet air cooling a gas turbine will have a higher mass flow rate and pressure ratio, yielding an increase in turbine output power and efficiency. But these cooling systems are limited in that the intake air cooling must not introduce freezing of ambient air moisture that will form ice crystals if the intake air is cooler than 46° F.

Gen-Sets are designed to operate and are tested at −25° F. Therefore, there is a need in the art for a system that will permit the removal of all damaging ice particles that might impact or scrape the impellor guide vanes of the turbine blades of the turbocompressor, so that the reduction of the air intake temperature from 100° F. to −25° F. would produce 30% higher electrical power output (see Solar Turbines, MARS 100 Gen-Set).

SUMMARY OF THE INVENTION

In an embodiment of the present invention, a centrifuge is provided to remove ice particles from a compander and natural gas turbine electric generator system. In an embodiment, the centrifuge is provided with three ducts. The first duct receives cold air from the compander, the cold air having damaging ice particles which must be removed. A second duct creates an airpath with the first duct that forces the cold air to bend at an angle of 90 degrees or more. The first duct extends beyond the intake of the second duct to create a dead zone to trap ice particles.

In an embodiment, a third duct creates an air-path with the second duct that forces the cold air to bend at an angle of 90 degrees or more. The second duct extends beyond the intake of the third duct to create a dead zone to trap ice particles.

In an embodiment, the dead zones at the end of the first duct and the second duct are further provided with revolving doors to remove the ice particles from the centrifuge. In one embodiment, the revolving doors rotate due to the pressure difference between the centrifuge and the air outside of the centrifuge. In another embodiment, the revolving doors are provided with an electric motor to assist with rotation.

In an embodiment, the revolving doors dispose of the ice particles into a heat exchange system. The ice particles are used in a heat exchange system to provide further cooling of air traveling through the turbocompressor prior to entering the turboexpander of the compander. The ice particles may also be collected and melted to provide a cold water supply.

In an embodiment, the revolving doors are connected to a heat exchange system to prevent the revolving doors from freezing and ceasing to rotate. In an embodiment the heat exchange system may be connected to conduct heat from the ground.

In an embodiment, the bends provided between the ducts is approximately 135 degrees to produce a Z-shaped centrifuge which has a small footprint.

In another embodiment, the system comprising the compander, centrifuge, and natural gas turbine generator is further provided with a compressor to provide compressed air into the intake of the compander at the beginning of the system.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-7, wherein like reference numerals refer to like elements.

Figure 1:
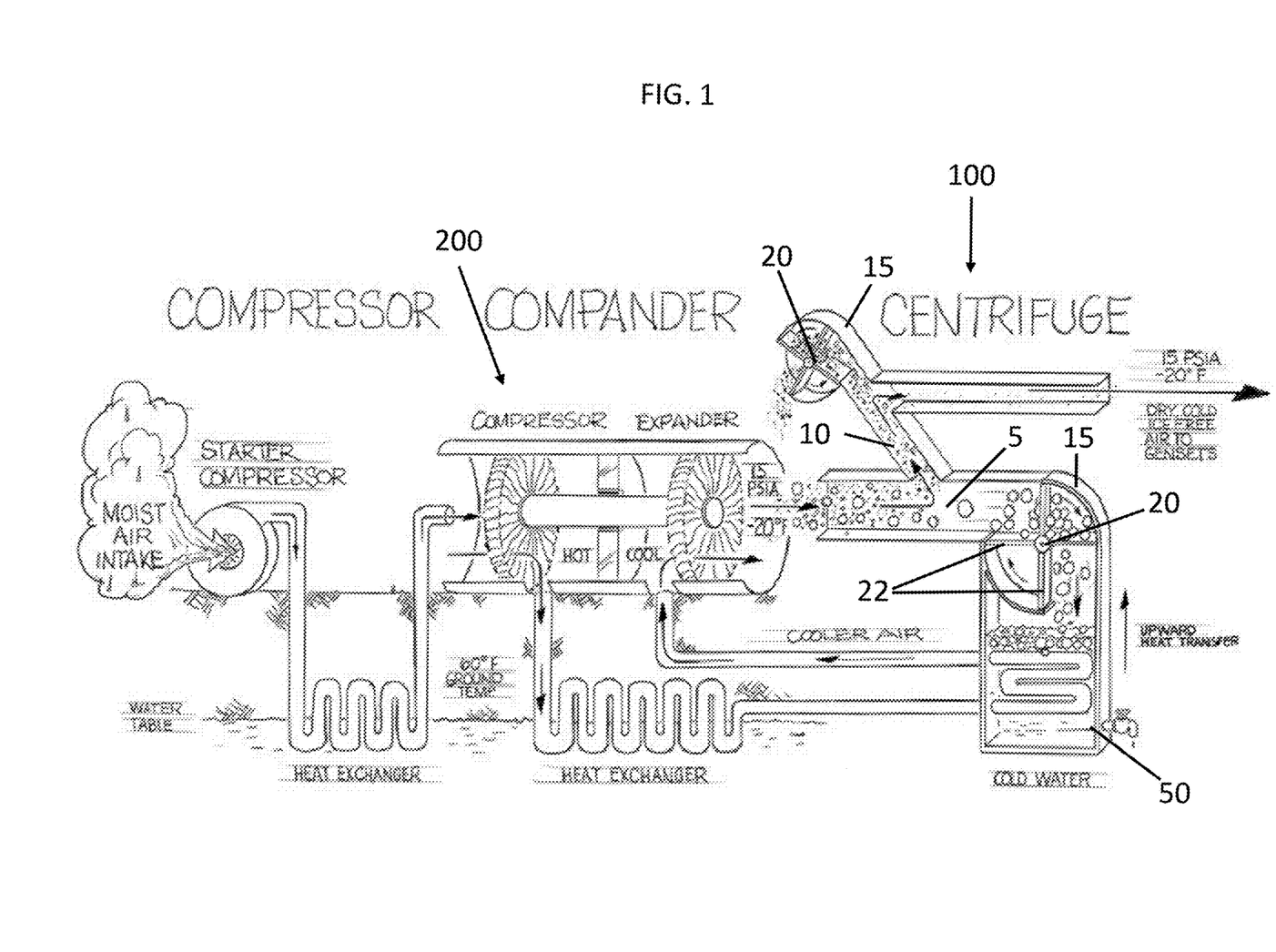
FIG. 1 is a perspective view of the centrifuge, according to an embodiment of the present invention.
Figure 2:
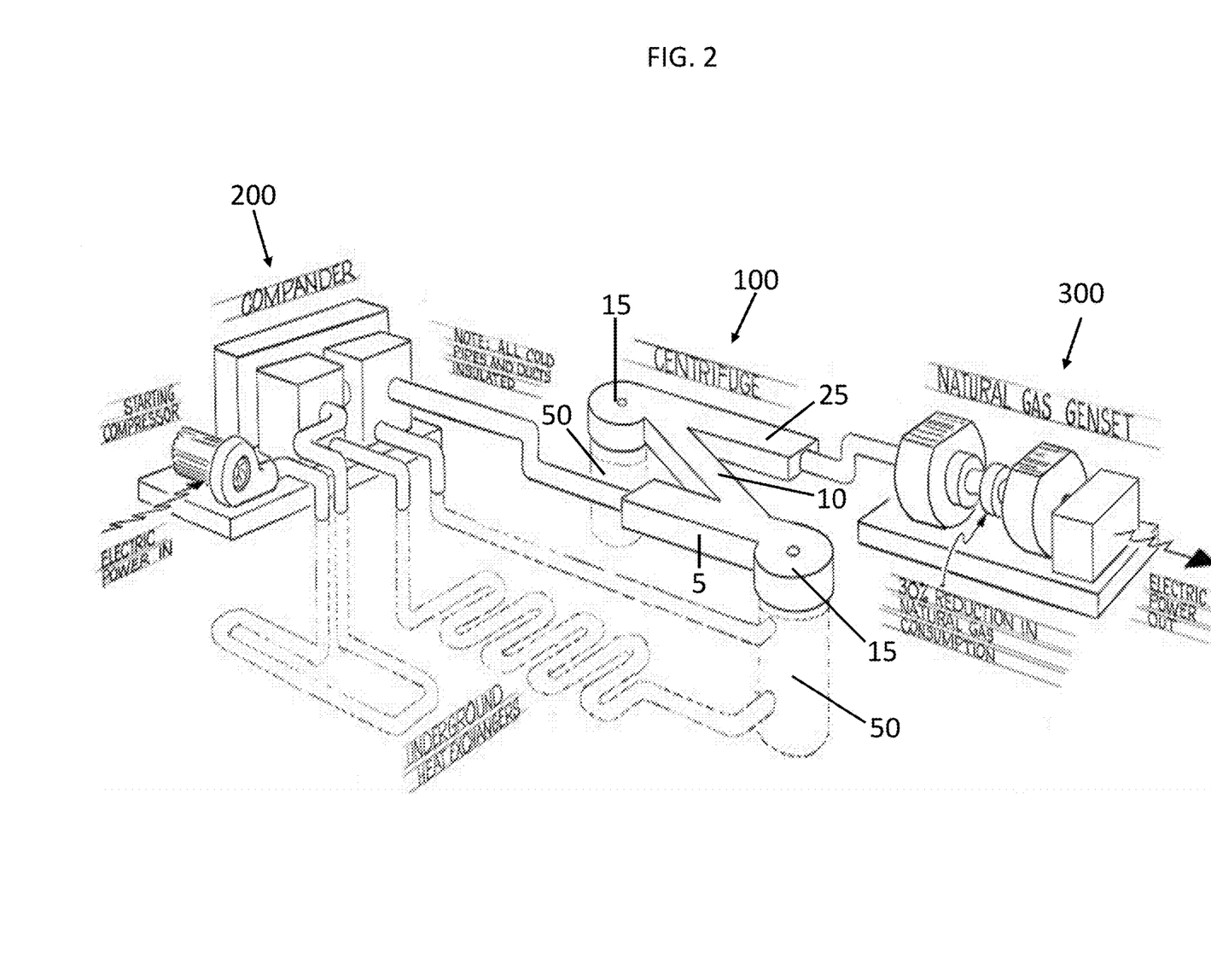
FIG. 2 is a perspective view of the centrifuge, according to an embodiment of the present invention.

In reference to FIG. 1-2, an embodiment of the centrifuge 100 is shown as a component of a compander 200 and natural gas Gen-Set 300 system. The centrifuge 100 is provided between the compander 200 and gas Gen-Set 300 to remove ice particulate which may cause damage to the impellor guide vanes and turbine blades of the turbo compressor.

In an embodiment, the Gen-Set 300 to be used in the system has a set of compressor tubing wheels with blades that intake air. Approximately half the energy from combustion drives the rotors between the stator to produce electricity, while the other half of the energy drives a turbocompressor that intakes the air and compresses it just prior to the fuel injection stage. When colder, denser air is feed to the turbocompressor of the Gen-Set 300, less energy is consumed by the turbocompressor allowing more fed to produce electricity.

In an embodiment, wherein a one-stage compander is utilized to generate air at −25° F., the cold air containing ice crystals if first sent through the centrifuge 100 to remove the ice. Then, the cold air is sent on to the Gen-Set 300. In the embodiment, a starter air compressor is used to drive the one-stage compander.

In another embodiment, wherein a two-stage compander is used to drive a desalination chamber, along with a centrifuge and Gen-set, a starter air compressor is used to drive the two-stage compander.

In an embodiment, the centrifuge 100 is provided with an intake duct 5, in which cold air exhausted by the compander is received by the centrifuge 100. In an embodiment, a bend duct 10 is provided at an angle 135-degrees, relative to the angle of the intake duct 5. The bend duct 10 introduces a sharply curved air-path which can only be followed by fine particles, partially followed by medium-sized particles, and not followed by large particles.

In an embodiment, the intake duct 5 continues past the bend duct 10 to provide for a dead-zone 15. Theoretically the dead-zone 15 (wherein air flow has ceased or been limited), is located in the intake duct 5 at a distance from the bend duct 10, wherein the distance is at least four times the diameter of the intake duct.

In an embodiment, the dead-zone 15 is further provided with a revolving door 20. The revolving door comprises of door panels 22, wherein some of the panels 22 stop the air flow at the end of the intake duct 5 and accumulate ice particles while the other panels dump ice particles. The door panels 22 should create a complete or near complete seal against the walls of the dead-zone to prevent the cold air from escaping the centrifuge.

In an embodiment, the ice particles collected at the end of the intake duct 5 are deposited into a collection vessel 50 by the revolving door 20. The collection vessel 50 is provided as part of a heat exchange and allows for the deposited ice particulate to contribute to the cold air supply being exhausted to the expander. In an embodiment, the deposited ice particulate can be collected and used as a fresh water source.

In an embodiment, the revolving door 20 turns at a constant rate with assistance from a motor. In another embodiment, the revolving door may turn due to the pressure differential created between the duct and the air. In an embodiment, heat exchange is maintained with the ground through conductive walls of the collection vessel, such that the revolving door is able to rotate without sticking due to ice build-up.

In an embodiment, the centrifuge 100, is provided with a second 135° bend in the air-path as the air travels from the bend duct 10 to the exit duct 25. In an embodiment, the bend duct 10 continues straight to provide a second dead-zone 15. The second dead-zone is also provided with a revolving door 20, allowing for ice particles to be removed from the system. In the embodiment, the exit duct 25 will then guide the air-path, with potentially damaging ice particle removed, to the natural gas Gen-Set 300.

Embodiments of the present invention have been described wherein three ducts are utilized, and each duct is presented such that the air-path bends at 135°. However, it can be imagined that the bends provided may be at any appropriate range, and more ducts may be utilized to improve efficiency of ice particulate removal.

Figure 3:
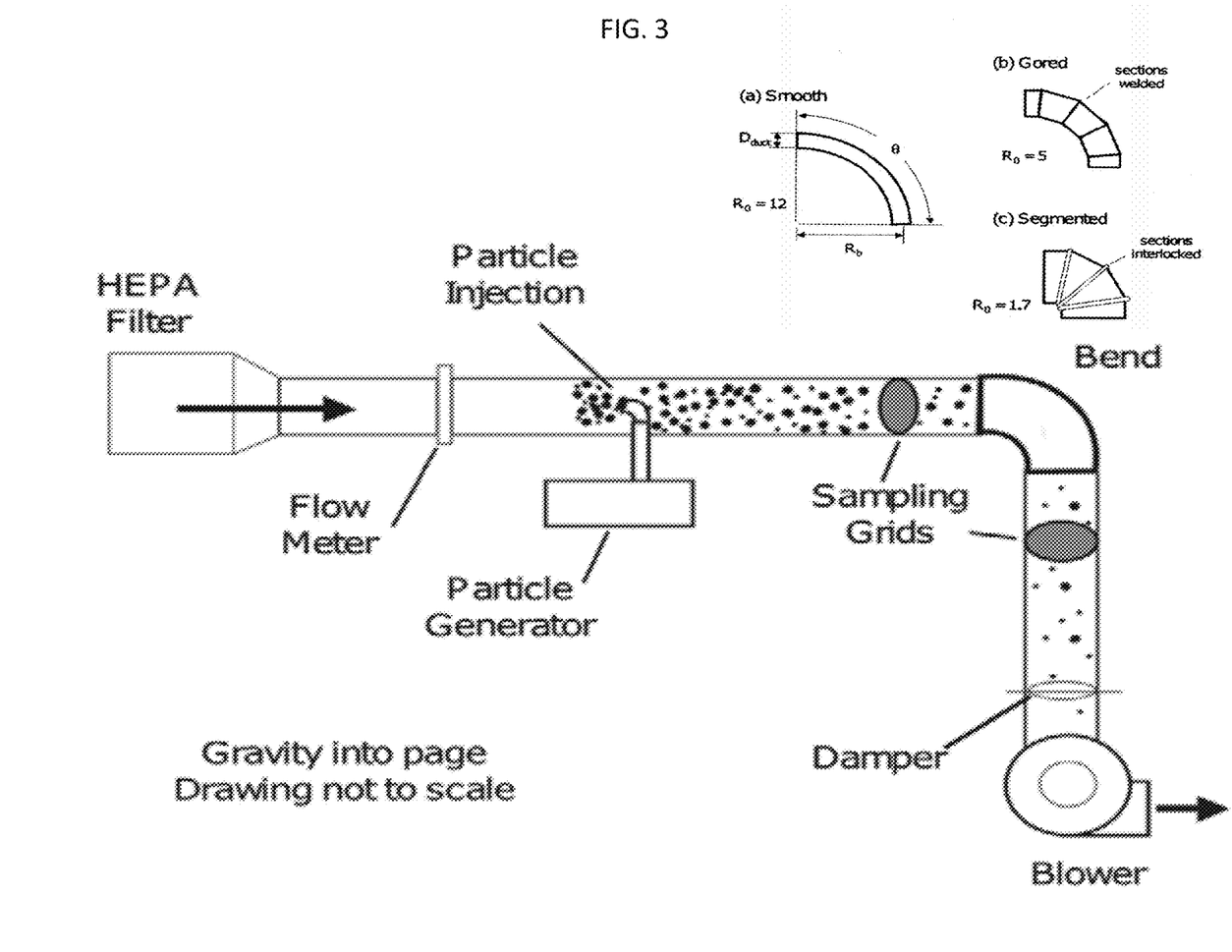
FIG. 3 is a perspective view of a particle disposition test, according to an embodiment of the present invention.

In reference to FIG. 3, an embodiment of a particle disposition test is shown. Several mechanisms, including Brownian diffusion, gravitational setting and electrostatic forces, can cause particles to deposit in ducts. In bends, the mechanism of inertial impaction dominates deposition for particles >10 μm. Given sufficient inertial force, a particle will deviate from airflow streamlines and hit the bend wall. Deposition will occur if the adhesive forces are greater than the rebound forces.

Particle deposition in bends has been characterized with the following dimensionless parameters: particle Stokes number (Stk=$\tau U_0/a$), particle free-stream Reynolds number (Re$_{p\infty}$=D$_p$U$_0$/v), flow Reynolds number (Re=D$_{duct}$U$_0$/v), Dean's Number (De=Re/(R$_o$)$^{0.5}$, and R$_0$=curvature ratio=R$_b$/a where R$_b$=radius of bend and a=duct radius.

Figure 4:
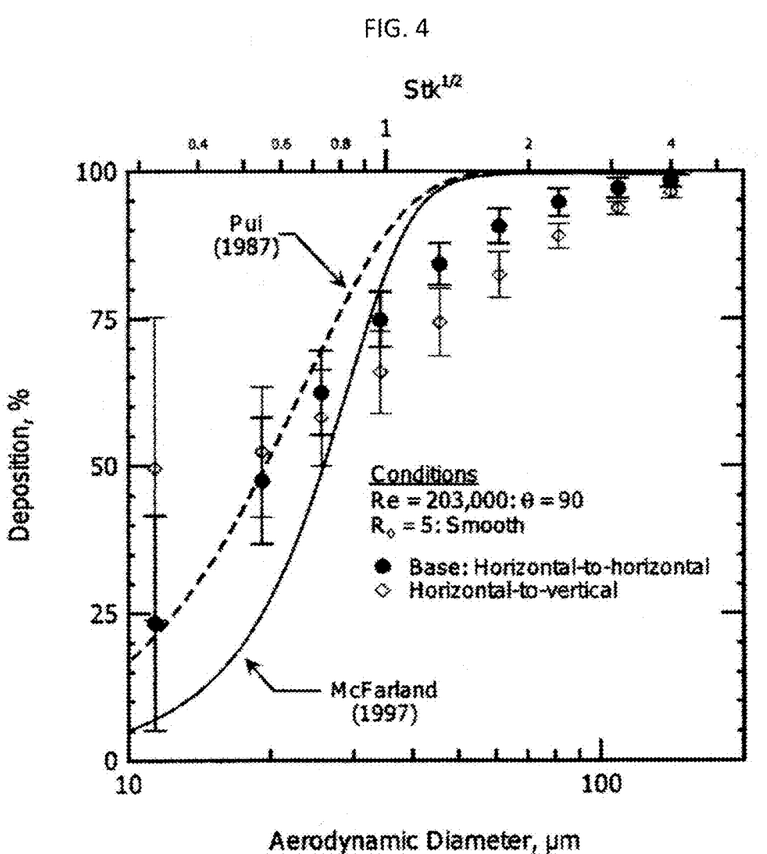
FIG. 4 is a graphical representation of a particle disposition test utilizing glass beads, according to an embodiment of the present invention.

In reference to FIG. 4, the results of the test run in the set up shown in FIG. 3 are provided. Upstream of the test bend, an aerosol generator introduced polydisperse glass spheres that ranged in size from 5 to 150 μm. Particle profiles were uniform in concentration and size distribution. To capture and retain particles that hit the wall, the interior of the bend was coated with petroleum jelly.

Note that theory predicted that all particles with Stokes Number greater than 1 (Stk>1) would deposit on the bend. However, tests showed leakage. However, at Stk>4 the large particles were completely removed.

Note that the Stokes Number for glass with $\rho_p$=2.4 to 2.8 gm/cc whereas ice with $\rho_p$=0.917 gm/cc. Thus we could translate this chart because Stk ~$\rho_p D_p^2$, the lower density results would apply to larger ice particle diameters for the same Stoke's Number.

Figure 5:
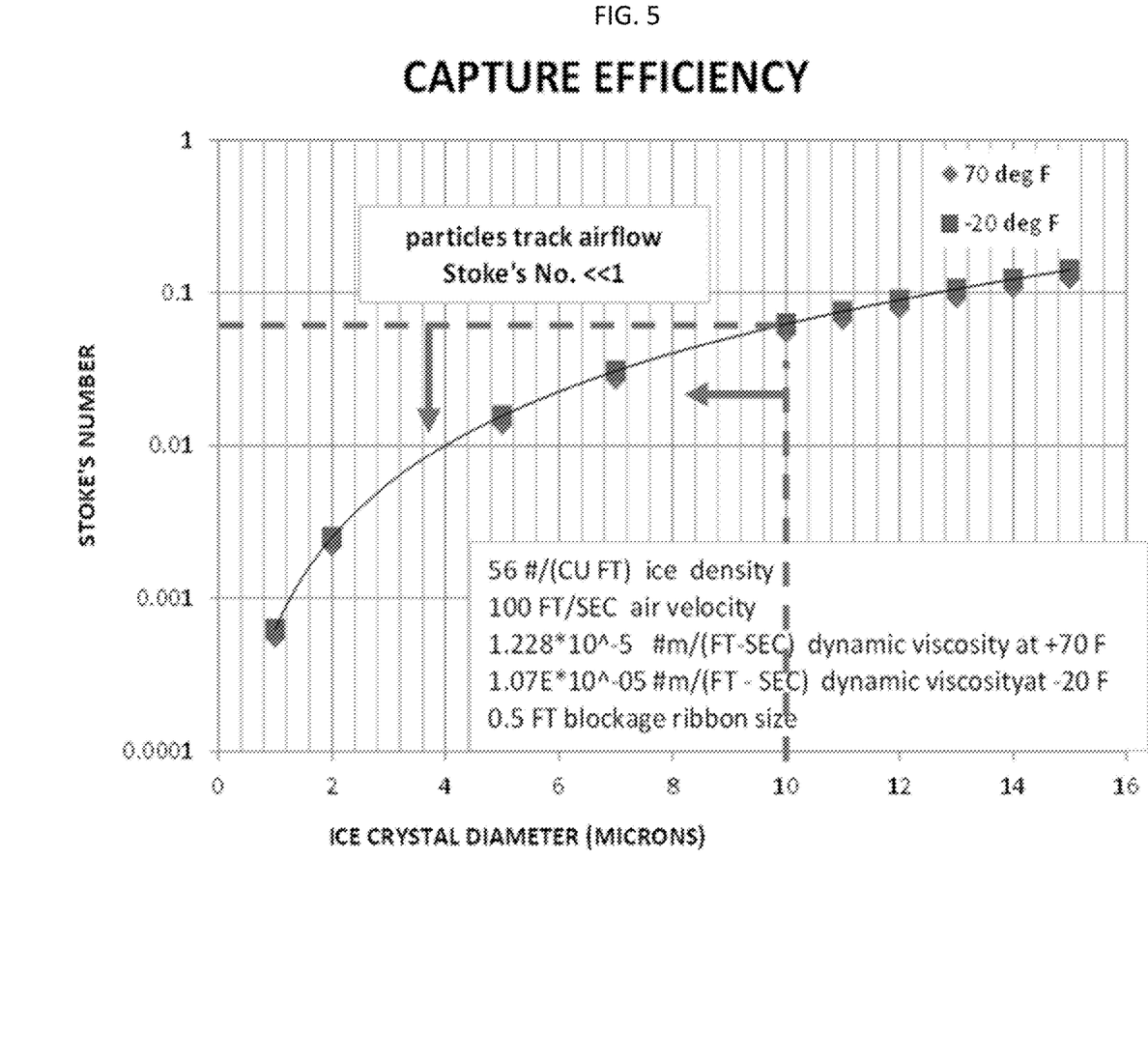
FIG. 5 is a graphical representation of a particle disposition test translated for ice particles, according to an embodiment of the present invention.

In reference to FIG. 5, the translation of deposition efficiency from glass beads to ice crystals is shown, specified by the conditions shown on the chart. It should be noted that ice particles of the order of 10 microns in diameter will be removed with high efficiency but may require more than one bend to enhance the efficiency. Furthermore, ice particles of the order of less than 5 microns will not be removed as would be expected because of the Stokes Number dependence on the square of the particle diameter. Additionally, the air temperature is a weak influence on the deposition efficiency in the range of air temperatures of interest herein.

Figure 6A:
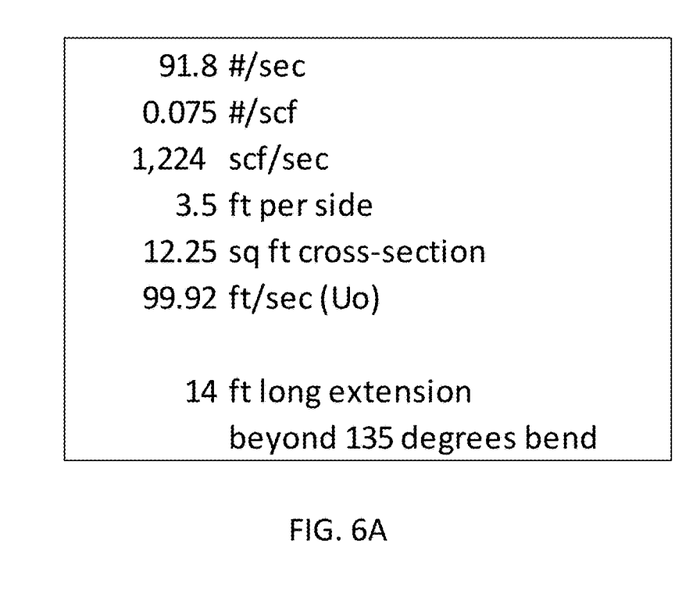
FIG. 6A is a numerical analysis of the centrifuge, according to an embodiment of the present invention.

In reference to FIG. 6, in an embodiment the intake air requirement for the MARS 100 Gen-Set with 91.8 pounds per second intake air at −20° F. FIG. 5 is calculated for U$_o$=100 ft/sec. In reference to FIG. 6A, The use of a square duct with 3.5 feet to a side results in 100 ft/sec air velocity in the duct. This will require the straight duct extension of 4*3.5 ft or 14 ft extension.

Figure 6B:
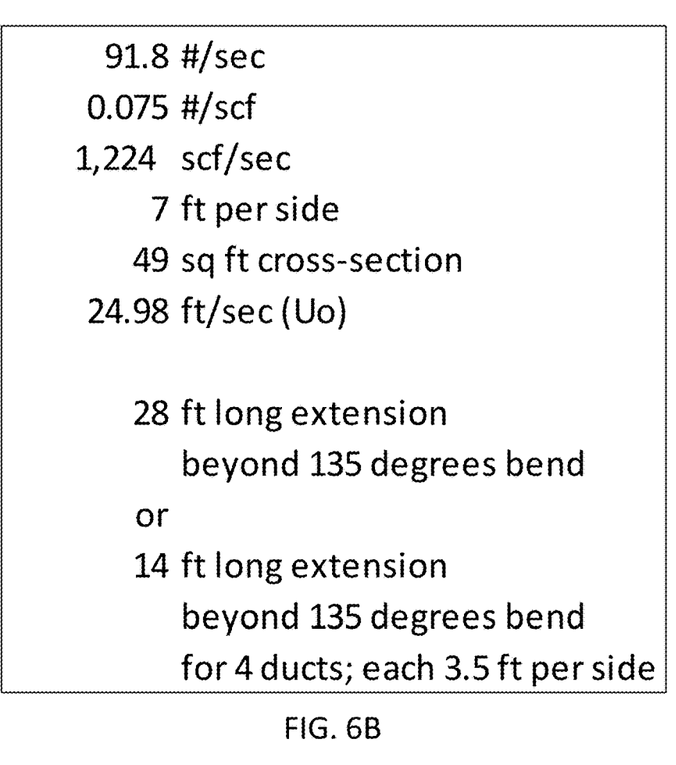
FIG. 6B is a numerical analysis of the centrifuge, according to an embodiment of the present invention.

In reference to FIG. 6B, The use of a square duct with 7 feet to a side results in 25 ft/sec air velocity in the duct. If FIG. 5 is to be used again the 4-fold reduction in U$_o$ will require that where 10μ (10 microns) is shown it needs to be replaced with 20μ. This is not the right direction that we want in order to centrifuge the larger and more damaging ice particles out of the air flow. Furthermore, this will require the straight duct extension of 4*7 feet or 28 foot extension that is also in the wrong direction.

In an embodiment, the advantage of a lower pressure drop along the duct is countered by reduced efficiency in removing larger ice particles and having a longer duct extension of 28 feet beyond the 135 degrees bend.

In an embodiment, if there is a space limitation one can still work with 25 feet/sec air flow but one would use 4 ducts in parallel so that the extension 14 feet instead of 28 feet.

Figure 7:
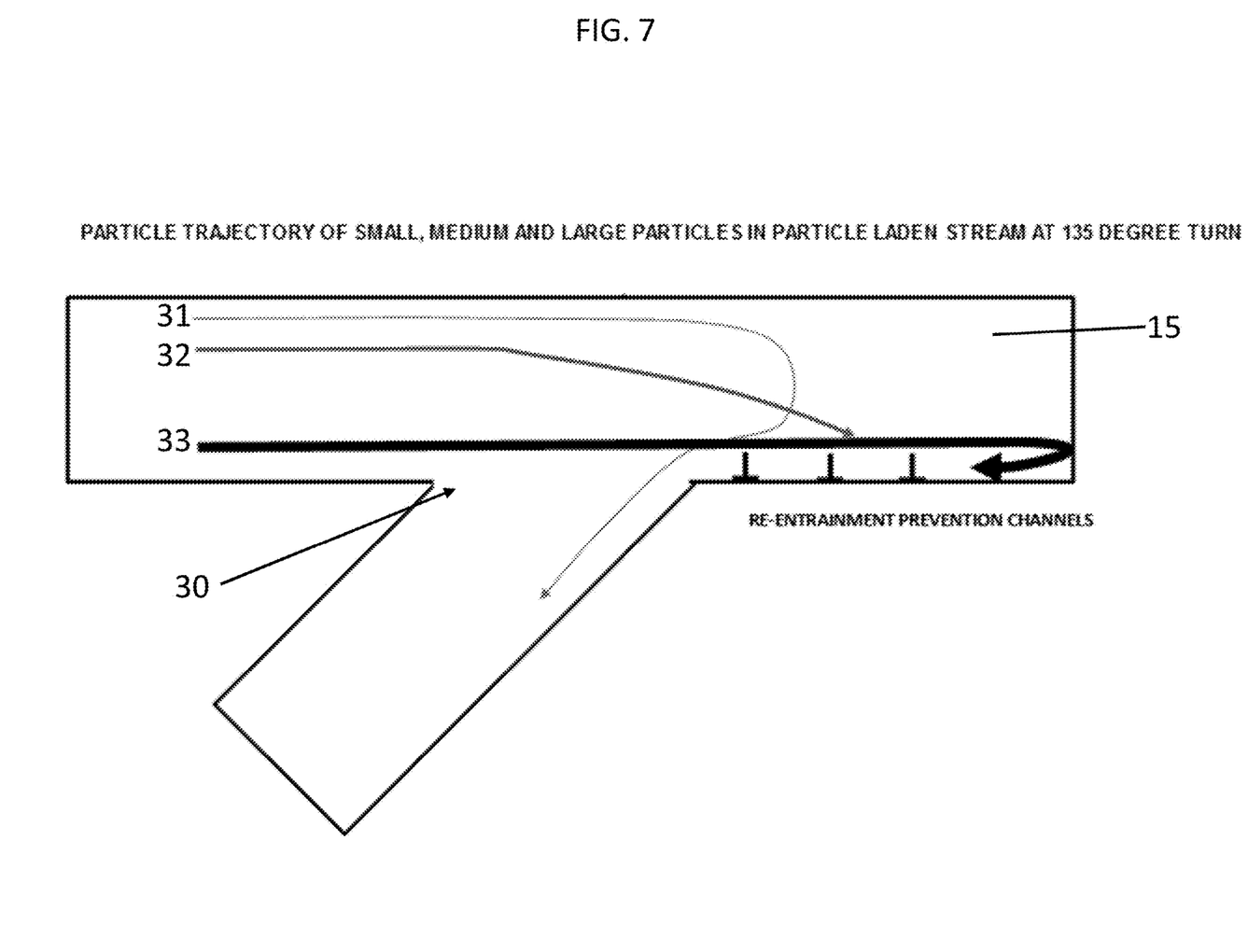
FIG. 7 is a cross-sectional of the centrifuge in use, according to an embodiment of the present invention.

In reference to FIG. 7, an embodiment of the innovative centrifuge design is shown. Not only is there a 135-degree bend 30, but it is followed by a dead-zone 15 downstream of the bend. The dead zone is an extension of the straight duct that is more than four diameters downstream of the bend. The bend introduces a sharply curved air streamline that can only be tracked by fine particles 31, partially tracked by medium sized particles 32 and not tracked by large sized particles 33. It is expected that particles are re-entrained if permitted to remain in the trapped zone. Thus, channels are introduced onto the bottom surface of the duct to retain the trapped particles. As with any polydispersed aerosol with different size particles, each 135-degree bend will essentially retain its efficiency in removing specific particle sizes. So that two 135-degree bends will be used to assure high efficiency performance.

In an exemplary embodiment, the SAP Data Center in Germany utilizes 13 diesel generators to produce a total of 29 megawatts to cover the data center's electricity demand in the event of an emergency or unexpected power outage. The use of 2 Solar Turbine MARS 100, would be able to produce up to 26 megawatts and could be used to replace some or all of the diesel engines.

The very small ice particles, on the order of less than 5 microns in diameter, track the streamlines of the air safely and flow in the open space between the rotating blades, entering the succession of rotating compressor blades without causing damage. On the other hand, the increasing air temperature across the compression process, caused by the successive impeller wheels of compressor turbines, causes the solid ice crystals to vaporize and aid in reducing the intake air temperature flowing through the compressor train. This process aids in both keeping air blade temperatures down and further enhancing the electrical power output.

Turbines are lightweight and have a compact footprint, producing three to four times the power in the same space as reciprocating engines of similar capacity, before consideration of improved efficiency when operating with cold air, at a temperature range of −20° F. to −25° F. Their design is extremely simple, there is no liquid cooling system to maintain, no lubricating oil to change, no spark plugs to replace, and no complex overhauls to perform (only combustor replacement after about 60,000 hours of duty). Emissions are extremely low, especially with the latest advances, such as lean-premixed combustion technology. Turbines are ideally suited for loads of 5 MW and considerably larger. They can operate on low-energy fuels and perform extremely well with high-Btu fuels, such as propane.

Additionally, turbines are well suited for combined heat and power and produce a higher exhaust temperature, at about 900° F. Furthermore, the turbines have a low weight, simple design, lower emissions and smaller space requirement compared to reciprocating engine generators.

Industrial gas turbine models with their compact and rugged design make them an ideal choice for both industrial power generation and mechanical drive applications. They also perform well in decentralized power generation applications. Their high steam-raising capabilities help achieve overall plant efficiency of 80 percent or higher Diesels are often used because of their short startup times. Thus, there is a combination of Diesel Engines and Gas Turbine Engines that are practical, but not yet in use.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A gas turbine system having:

a. a compander to exhaust cold air to a centrifuge;

b. a centrifuge to remove ice particles for the cold air, the centrifuge having:

i. a first duct having:

1. a first end to receive air from a compander, and 2. a second end having a first revolving door;

ii. a second duct having:

1. a first end to receive air from the first duct, and 2. a second end having a second revolving door, and iii. a third duct having:

1. a first end to receive air from the second duct, and 2. a second end leading to a gas turbine generator, iv. wherein the centrifuge defines an air-path, and wherein the air-path follows a bend greater than 90-degrees from the first duct to the second duct, and wherein the air-path follows a bend greater than 90-degrees from the second duct to the third duct; and c. a natural gas turbine generator to provide electricity, wherein the cold air from the centrifuge, which is free from ice particles, improves efficiency of the natural gas turbine generator further comprising a compressor to provide compressed air to an intake of the compander; wherein ice particles collect and are removed from the centrifuge by the first revolving door and the second revolving door; and wherein the ice particles which have been removed from the centrifuge are placed into a heat exchange system.

2. The centrifuge of claim 1, wherein the first revolving door and the second revolving door move due to the pressure difference between air inside the duct and air outside of the duct.

3. The centrifuge of claim 1, wherein the first revolving door and the second revolving door each rotate with assistance from an electric motor.

4. The centrifuge of claim 1, wherein the ice particles which have been removed from the centrifuge are collected in a cold water supply.

* * * * *